(12) United States Patent
Yap et al.

(10) Patent No.: US 6,606,655 B1
(45) Date of Patent: Aug. 12, 2003

(54) SERVER APPARATUS FOR PROVIDING A REALTIME VISUALIZATION OF AT LEAST ONE IMAGE

(75) Inventors: Chee K. Yap, New York, NY (US); Ee-Chien Chang, New York, NY (US); Ting-Jen Yen, Jersey City, NJ (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 09/564,162

(22) Filed: May 3, 2000

Related U.S. Application Data

(62) Division of application No. 09/005,174, filed on Jan. 9, 1998, now Pat. No. 6,182,114.

(51) Int. Cl.[7] .............................................. G06F 15/16
(52) U.S. Cl. ...................................................... 709/219
(58) Field of Search ................................. 709/247, 217, 709/218, 219; 382/232, 233, 235, 282, 283, 276

(56) References Cited

U.S. PATENT DOCUMENTS

| | | | |
|---|---|---|---|
| 4,622,632 A | 11/1986 | Tanimoto | |
| 5,341,466 A | 8/1994 | Perlin | |
| 5,432,871 A * | 7/1995 | Novik | 382/232 |
| 5,481,622 A | 1/1996 | Gerhardt et al. | 382/103 |
| 5,568,598 A | 10/1996 | Mack et al. | 382/302 X |
| 5,710,835 A | 1/1998 | Bradley | 382/233 |
| 5,724,070 A | 3/1998 | Denninghoff et al. | 382/235 X |
| 5,861,920 A | 1/1999 | Mead et al. | 382/232 X |
| 5,880,856 A | 3/1999 | Ferriere | 382/240 X |
| 5,920,865 A | 7/1999 | Ariga | 707/10 |
| 5,991,816 A * | 11/1999 | Percival et al. | 709/247 |
| 6,006,231 A * | 12/1999 | Popa | 707/101 |
| 6,252,989 B1 * | 6/2001 | Geisler et al. | 382/232 |

OTHER PUBLICATIONS

Vojislav Lalich–Petrich, Progressive Image Transmission Capability (PROTRAC) on the World Wide Web, 3rd International World Wide Web Conference, Apr. 1995, 7 pages.*

E.C. Chang et al., "Realtime Visualization of Large . . . " Mar. 31, 1997, pp. 1–9, Courant Institute of Mathematical Sciences, New York University, NY U.S.A.

E.C. Chang et al., "A Wavelet Approach to Foveating Images", Jan. 10, 1997, pp. 1–11, Courant Institute of Mathematical Sciences, New York University, NY U.S.A.

S.G. Mallat, "A Theory for Multiresolutional Signal Decomposition . . . " IEEE Transactions on Pattern Analysis and Machine Intelligence, pp. 3–23, Jul. 1989, vol. 11, No. 7, IEEE Computer Society.

News Release, "Wavelet Image Features", Summus' Wavelet Image Compression, Summus 14 pages.

R.L. White et al., "Compression and Progressive Transmission of Astonimical Images", SPIE Technical Conference 2199, 1994.

E.L. Schwartz. "The Development of Specific Visual . . . " Journal of Theoretical Biology, 69:655–685, 1997.

F.S. Hill Jr. et al., "Interactive Image Query . . . " Computer Graphics, 17(3), 1983.

(List continued on next page.)

Primary Examiner—Patrice Winder
(74) Attorney, Agent, or Firm—Baker Botts L.L.P.

(57) ABSTRACT

Processing element on a server performs a (wavelet) transform on an image held by the server storage device. Client user continuously specifies a foveal region with user input means dynamically, in realtime, which request is converted to a request for wavelet coefficients on the server corresponding to the foveal region. As the server continuously sends requested coefficients, client inverse wavelet transform means performs inverse wavelet transform on coefficients and continuously updates the image on the display.

8 Claims, 6 Drawing Sheets

OTHER PUBLICATIONS

T.H. Reeves et al., "Adaptive Foveation of MPEG VIDEO", Proceedings of the 4th ACM International Multimedia Conference, 1996.

R.S. Wallace et al., "Space–variant image processing" Int'l. J. of Computer Vision. 13:1 (1994) 71–90.

E.L. Schwartz A quantitative model of the functional architecture: Biological cybernetics, 37 (1980) 63–76.

P. Kortum et al., "Implementation of a Foveated Image . . . " Human Vision and Electronic Imaging, SPIE Proceedings vol. 2657, 350–360, 1996.

M.H. Gross et al., "Efficient triangular surface . . . ", IEEE Trans on Visualization and Computer Graphics, 2(2) 1996.

Tams Frajka et al., Progressive Image Coding with Spatially Variable Resolution, IEEE, Proceedings International Conference on Image Processing 1997, Oct. 1997, vol. 1, pp. 53–56.

* cited by examiner

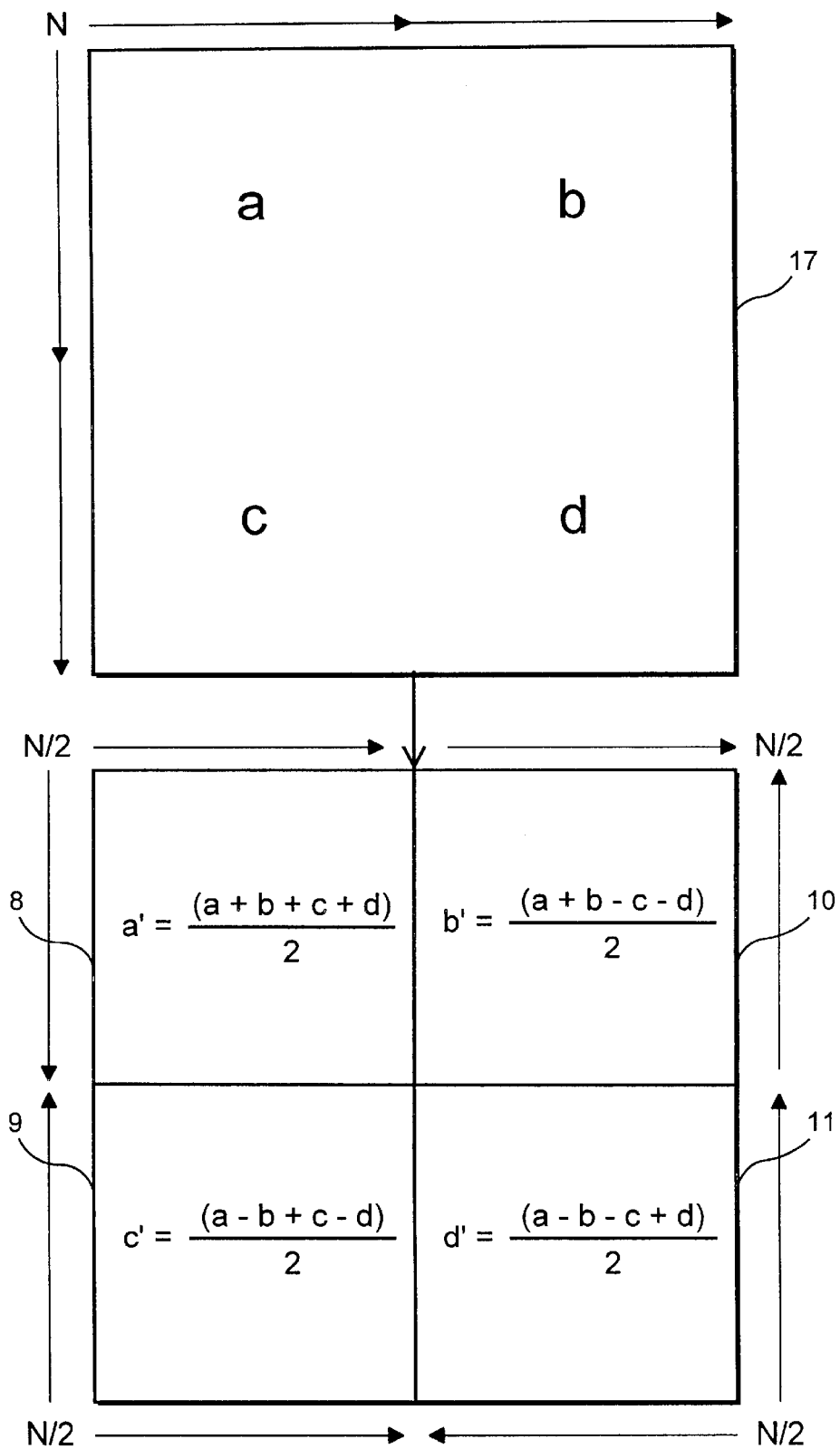
F I G. 2A $$a = \frac{a' + b' + c' + d'}{2} \quad b = \frac{a' + b' - c' - d'}{2}$$

$$c = \frac{a' - b' + c' - d'}{2} \quad d = \frac{a' - b' - c' + d'}{2}$$

17

$$a' = \frac{(a + b + c + d)}{2} \quad b' = \frac{(a + b - c - d)}{2}$$

8, 10

$$c' = \frac{(a - b + c - d)}{2} \quad d' = \frac{(a - b - c + d)}{2}$$

9, 11

F I G. 2B

SERVER APPARATUS FOR PROVIDING A REALTIME VISUALIZATION OF AT LEAST ONE IMAGE

This is a divisional of application Ser. No. 09/005,174 filed Jan. 9, 1998, now U.S. Pat. No. 6,182,119.

FIELD OF THE INVENTION

The present invention relates to a method and apparatus for serving images, even very large images, over a "thinwire" (e.g., over the Internet or any other network or application having bandwidth limitations).

BACKGROUND INFORMATION

The Internet, including the World Wide Web, has gained in popularity in recent years. The Internet enables clients/users to access information in ways never before possible over existing communications lines.

Often, a client/viewer desires to view and have access to relatively large images. For example, a client/viewer may wish to explore a map of a particular geographic location. The whole map, at highest (full) level of resolution will likely require a pixel representation beyond the size of the viewer screen in highest resolution mode.

One response to this restriction is for an Internet server to pre-compute many smaller images of the original image. The smaller images may be lower resolution (zoomed-out) views and/or portions of the original image. Most image archives use this approach. Clearly this is a sub-optimal approach since no preselected set of views can anticipate the needs of all users.

Some map servers (see, e.g., URLs http://www.mapquest.com and http://www.MapOnUs.com) use an improved approach in which the user may zoom and pan over a large image. However, transmission over the Internet involves significant bandwidth limitations (i.e, transmission is relatively slow). Accordingly, such map servers suffer from at least three problems:

Since a brand new image is served up for each zoom or pan request, visual discontinuities in the zooming and panning result. Another reason for this is the discrete nature of the zoom/pan interface controls.

Significantly less than realtime response.

The necessarily small fixed size of the viewing window (typically about 3"×4.5"). This does not allow much of a perspective.

To generalize, what is needed is an apparatus and method which allows realtime visualization of large scale images over a "thinwire" model of computation. To put it another way, it is desirable to optimize the model which comprises an image server and a client viewer connected by a low bandwidth line.

One approach to the problem is by means of progressive transmission. Progressive transmission involves sending a relatively low resolution version of an image and then successively transmitting better resolution versions. Because the first, low resolution version of the image requires far less data than the full resolution version, it can be viewed quickly upon transmission. In this way, the viewer is allowed to see lower resolution versions of the image while waiting for the desired resolution version. This gives the transmission the appearance of continuity. In addition, in some instances, the lower resolution version may be sufficient or may in any event exhaust the display capabilities of the viewer display device (e.g., monitor).

Thus, R. L. White and J. W. Percival, "Compression and Progressive Transmission of Astronomical Images," *SPIE Technical Conference* 2199, 1994, describes a progressive transmission technique based on bit planes that is effective for astronomical data.

However, utilizing progressive transmission barely begins to solve the "thinwire" problem. A viewer zooming or panning over a large image (e.g., map) desires realtime response. This of course is not achieved if the viewer must wait for display of the desired resolution of a new quadrant or view of the map each time a zoom and pan is initiated. Progressive transmission does not achieve this realtime response when it is the higher resolution versions of the image which are desired or needed, as these are transmitted later.

The problem could be effectively solved, if, in addition to variable resolution over time (i.e, progressive transmission), resolution is also varied over the physical extent of the image.

Specifically, using foveation techniques, high resolution data is transmitted at the user's gaze point but with lower resolution as one moves away from that point. The very simple rationale underlying these foveation techniques is that the human field of vision (centered at the gaze point) is limited. Most of the pixels rendered at uniform resolution are wasted for visualization purposes. In fact, it has been shown that the spatial resolution of the human eye decreases exponentially away from the center gaze point. E. L. Schwartz, "The Development of Specific Visual Projections in the Monkey and the Goldfish: Outline of a Geometric Theory of Receptotopic Structure," *Journal of Theoretical Biology*, 69:655–685, 1977.

The key then is to mimic the movements and spatial resolution of the eye. If the user's gaze point can be tracked in realtime and a truly multi-foveated image transmitted (i.e., a variable resolution image mimicking the spatial resolution of the user's eye from the gaze point), all data necessary or useful to the user would be sent, and nothing more. In this way, the "thinwire" model is optimized, whatever the associated transmission capabilities and bandwidth limitations.

In practice, in part because eye tracking is imperfect, using multi-foveated images is superior to atempting display of an image portion of uniform resolution at the gaze point.

There have in fact been attempts to achieve multifoveated images in a "thinwire" environment.

F. S. Hill Jr., Sheldon Walker Jr. and Fuwen Gao, "Interactive Image Query System Using Progressive Transmission," *Computer Graphics*, 17(3), 1983, describes progressive transmission and a form of foveation for a browser of images in an archive. The realtime requirement does not appear to be a concern.

T. H. Reeves and J. A. Robinson, "Adaptive Foveation of MPEG Video," *Proceedings of the 4$^{th}$ ACM International Multimedia Conference*, 1996, gives a method to foveate MPEG-standard video in a thin-wire environment. MPEG-standard could provide a few levels of resolution but they consider only a 2-level foveation. The client/viewer can interactively specify the region of interest to the server/sender.

R. S. Wallace and P. W. Ong and B. B. Bederson and E. L. Schwartz, "Space-variant image processing". Intl. J. Of Computer Vision, 13:1 (1994)71–90 discusses space-variant images in computer vision. "Space-Variant" may be regarded as synonymous with the term "multifoveated" used above. A biological motivation for such images is the complex logmap model of the transformation from the retina to the visual cortex (E. L. Schwartz, "A quantitative model of the functional architecture of human striate cortex with application to visual illusion and cortical texture analysis", Biological Cybernetics, 37(1980) 63–76).

Philip Kortum and Wilson S. Geisler, "Implementation of a Foveated Image Coding System For Image Bandwidth Reduction," *Human Vision and Electronic Imaging, SPIE Proceedings Vol.* 2657, 350–360, 1996, implement a real time system for foveation-based visualization. They also noted the possibility of using foveated images to reduce bandwidth of transmission.

M. H. Gross, O. G. Staadt and R. Gatti, "Efficient triangular surface approximations using wavelets and quadtree data structures", IEEE Trans, On Visualization and Computer Graphics, 2(2), 1996, uses wavelets to produce multifoveated images.

Unfortunately, each of the above attempts are essentially based upon fixed super-pixel geometries, which amount to partitioning the visual field into regions of varying (predetermined) sizes called super-pixels, and assigning the average value of the color in the region to the super-pixel. The smaller pixels (higher resolution) are of course intended to be at the gaze point, with progressively larger super-pixels (lower resolution ) about the gaze point.

However, effective real-time visulization over a "thin wire" requires precision and flexibility. This cannot be achieved with a geometry of predetermined pixel size. What is needed is a flexible foveation technique which allows one to modify the position and shape of the basic foveal regions, the maximum resolution at the foveal region and the rate at which the resolution falls away. This will allow the "thin-wire" model to be optimized.

In addition, none of the above noted references addresses the issue of providing multifoveated images that can be dynamically (incrementally) updated as a function of user input. This property is crucial to the solution of the thinwire problem, since it is essential that information be "streamed" at a rate that optimally matches the bandwidth of the network with the human capacity to absorb the visual information.

SUMMARY OF THE INVENTION

The present invention overcomes the disadvantages of the prior art by utilizing means for tracking or approximating the user's gaze point in realtime and, based on the approximation, transmitting dynamic multifoveated image (s) (i.e., a variable resolution image over its physical extent mimicking the spatial resolution of the user's eye about the approximated gaze point) updated in realtime.

"Dynamic" means that the image resolution is also varying over time. The user interface component of the present invention may provide a variety of means for the user to direct this multifoveation process in real time.

Thus, the invention addresses the model which comprises an image server and a client viewer connected by a low bandwidth line. In effect, the invention reduces the bandwidth from server to client, in exchange for a very modest increase of bandwidth from the client to the server.

Another object of the invention is that it allows realtime visualization of large scale images over a "thinwire" model of computation.

An additional advantage is the new degree of user control provided for realtime, active, visualization of images (mainly by way of foveation techniques). The invention allows the user to determine and change in realtime, via input means (for example, without limitation, a mouse pointer or eye tracking technology), the variable resolution over the space of the served up image(s).

An additional advantage is that the invention demonstrates a new standard of performance that can be achieved by large-scale image servers on the World Wide Web at current bandwidth or even in the near future.

Note also, the invention has advantages over the traditional notion of progressive transmission, which has no interactivity. Instead, the progressive transmission of an image has been traditionally predetermined when the image file is prepared. The invention's use of dynamic (constantly changing in realtime based on the user's input) multifoveated images allows the user to determine how the data are progressively transmitted.

Other advantages of the invention include that it allows the creation of the first dynamic and a more general class of multifoveated images. The present invention can use wavelet technology. The flexibility of the foveation approach based on wavelets allows one to easily modify the following parameters of a multifoveated image: the position and shape of the basic foveal region(s), the maximum resolution at the foveal region(s), and the rate at which the resolution falls away. Wavelets can be replaced by any multi resolution pyramid schemes. But it seems that wavelet-based approaches are preferred as they are more flexible and have the best compression properties.

Another advantage is the present invention's use of dynamic data structures and associated algorithms. This helps optimize the "effective real time behavior" of the system. The dynamic data structures allow the use of "partial information" effectively. Here information is partial in the sense that the resolution at each pixel is only partially known. But as additional information is streamed in, the partial information can be augmented. Of course, this principle is a corollary to progressive transmission.

Another advantage is that the dynamic data structures may be well exploited by the special architecture of the client program. For example, the client program may be multi-threaded with one thread (the "manager thread") designed to manage resources (especially bandwidth resources). This manager is able to assess network congestion, and other relevant parameters, and translate any literal user request into the appropriate level of demand for the network. For example, when the user's gaze point is focused on a region of an image, this may be translated into requesting a certain amount, say, X bytes of data. But the manager can reduce this to a request over the network of (say) X/2 bytes of data if the traffic is congested, or if the user is panning very quickly.

Another advantage of the present invention is that the server need send only that information which has not yet been served. This has the advantage of reducing communication traffic.

Further objects and advantages of the invention will become apparent from a consideration of the drawings and ensuing description.

BRIEF DESCRIPTION OF DRAWINGS

FIG. 2a illustrates one level of a particular wavelet transform, the Haar wavelet transform, which the server may execute in one embodiment of the present invention.

FIG. 2b illustrates one level of the Haar inverse wavelet transform.

DETAILED DESCRIPTION OF THE INVENTION

Figure 1:
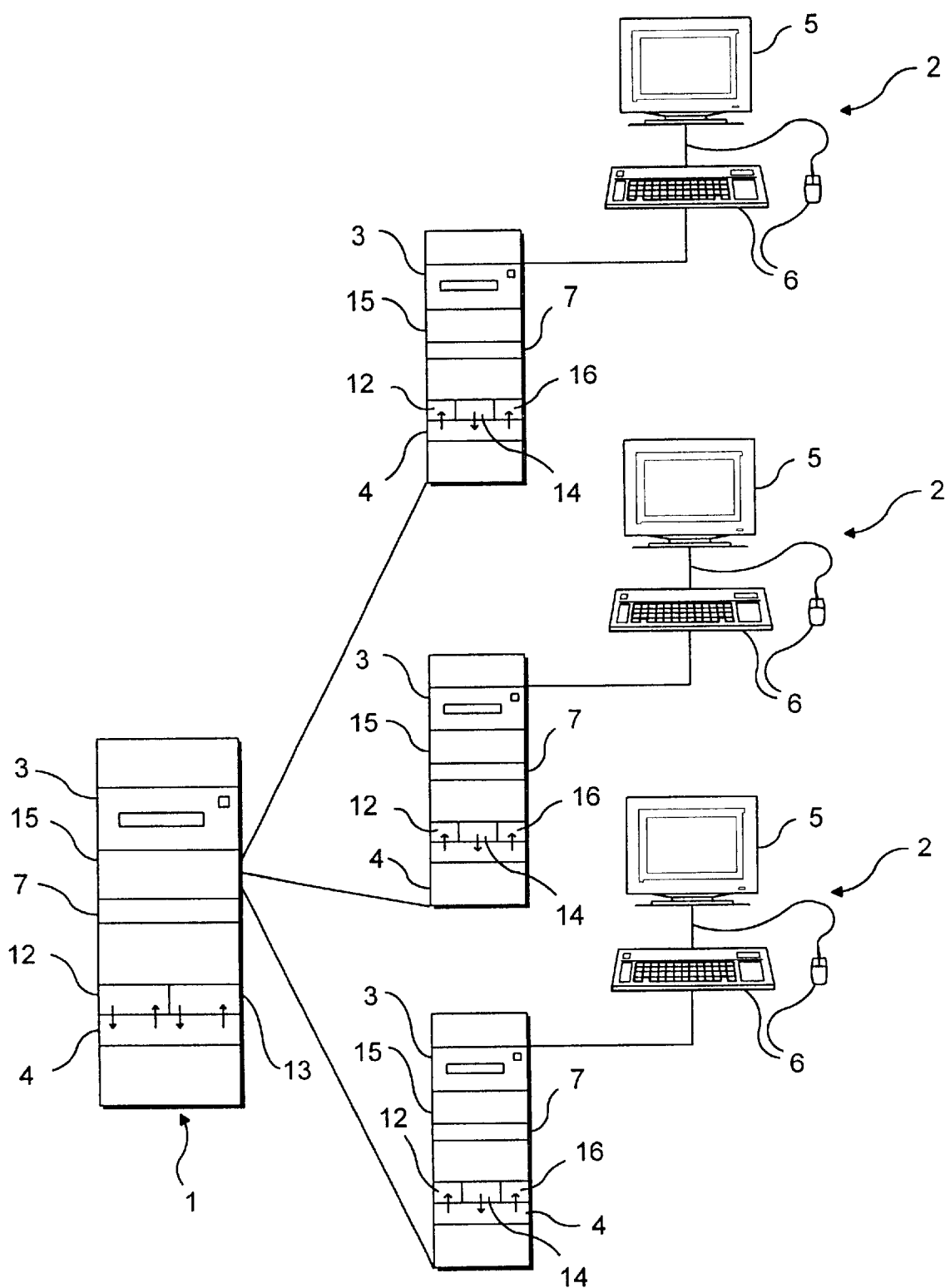
FIG. 1 shows an embodiment of the present invention including a server, and client(s) as well as their respective components.

FIG. 1 depicts an overview of the components in an exemplary embodiment of the present invention. A server 1 is comprised of a storage device 3, a memory device 7 and a computer processing device 4. The storage device 3 can be implemented as, for example, an internal hard disk, Tape Cartridge, or CD-ROM. The faster access and greater storage capacity the storage device 3 provides, the more preferable the embodiment of the present invention. The memory device 7 can be implemented as, for example, a collection of RAM chips.

The processing device 4 on the server 1 has network protocol processing element 12 and wavelet transform element 13 running off it. The processing device 4 can be implemented with a single microprocessor chip (such as an Intel Pentium chip), printed circuit board, several boards or other device. Again, the faster the speed of the processing device 4, the more preferable the embodiment. The network protocol processing element 12 can be implemented as a separate "software" (i.e., a program, sub-process) whose instructions are executed by the processing device 4. Typical examples of such protocols include TCP/IP (the Internet Protocol) or UDP (User Datagram Protocol). The wavelet transform element 13 can also be implemented as separate "software" (i.e., a program, sub-process) whose instructions are executed by the processing device 4.

In a preferred embodiment of the present invention, the server 1 is a standard workstation or Pentium class system. Also, TCP/IP processing may be used to implement the network protocol processing element 12 because it reduces complexity of implementation. Although a TCP/IP implementation is simplest, it is possible to use the UDP protocol subject to some basic design changes. The relative advantage of using TCP/IP as against UDP is to be determined empirically. An additional advantage of using modern, standard network protocols is that the server 1 can be constructed without knowing anything about the construction of its client(s) 2.

According to the common design of modern computer systems, the most common embodiments of the present invention will also include an operating system running off the processing means device 4 of the server 1. Examples of operating systems include, without limitation, Windows 95, Unix and Windows NT. However, there is no reason a processing device 4 could not provide the functions of an "operating system" itself.

The server 1 is connected to a client(s) 2 in a network. Typical examples of such servers 1 include image archive servers and map servers on the World Wide Web.

The client(s) 2 is comprised of a storage device 3, memory device 7, display 5, user input device 6 and processing device 4. The storage device 3 can be implemented as, for example, an internal hard disks, Tape Cartridge, or CD-ROM. The faster access and greater storage capacity the storage device 3 provides, the more preferable the embodiment of the present invention. The memory device 7 can be implemented as, for example, a collection of RAM chips. The display 5 can be implemented as, for example, any monitor, whether analog or digital. The user input device 6 can be implemented as, for example, a keyboard, mouse, scanner or eye-tracking device.

The client 2 also includes a processing device 4 with network protocol processing element 12 and inverse wavelet transform element means 14 running off it. The processing device 4 can be implemented as, for example, a single microprocessor chip (such as an Intel Pentium chip), printed circuit board, several boards or other device. Again, the faster the run time of the processing device 4, the more preferable the embodiment. The network protocol processing element 12 again can be implemented as a separate "software" (i.e., a program, sub-process) whose instructions are executed by the processing device 4. Again, TCP/IP processing may be used to implement the network protocol processing element 12. The inverse wavelet transform element 14 also may be implemented as separate "software." Also running off the processing device 4 is a user input conversion mechanism 16, which also can be implemented as "software."

As with the server 1, according to the common design of modern computer systems, the most common embodiments of the present invention will also include an operating system running off the processing device 4 of the client(s) 2.

In addition, if the server 1 is connected to the client(s) 2 via a telephone system line or other systems/lines not carrying digital pulses, the server 1 and client(s) 2 both also include a communications converter device 15. A communications converter device 15 can be implemented as, for example, a modem. The communications converter device 15 converts digital pulses into the frequency/signals carried by the line and also converts the frequency/signals back into digital pulses, allowing digital communication.

In the operation of the present invention, the extent of computational resources (e.g., storage capacity, speed) is a more important consideration for the server 1, which is generally shared by more than one client 2, than for the client(s) 2.

In typical practice of the present invention, the storage device 3 of the server 1 holds an image file, even a very large image file. A number of client 2 users will want to view the image.

Prior to any communication in this regard between the server 1 and client(s) 2, the wavelet transform element 13 on the server 1 obtains a wavelet transform on the image and stores it in the storage device 3.

There has been extensive research in the area of wavelet theory. However, briefly, to illustrate, "wavelets" are defined by a group of basis functions which, together with coefficients dependant on an input function, can be used to approximate that function over varying scales, as well as represent the function exactly in the limit. Accordingly, wavelet coefficients can be categorized as "average" or "approximating coefficients" (which approximate the function) and "difference coefficients" (which can be used to reconstruct the original function exactly). The particular approximation used as well as the scale of approximation depend upon the wavelet bases chosen. Once a group of basis functions is chosen, the process of obtaining the relevant wavelet coefficients is called a wavelet transform.

In the preferred embodiment, the Haar wavelet basis functions are used. Accordingly, in the preferred embodiment, the wavelet transform element 13 on the server 1 performs a Haar wavelet transform on a file representation of the image stored in the storage device 3, and then stores the transform on the storage device 3. However, it is readily apparent to anyone skilled in the art that any of the wavelet family of transforms may be chosen to implement the present invention.

Note that once the wavelet transform is stored, the original image file need not be kept, as it can be reconstructed exactly from the transform.

FIG. 2 illustrates one step of the Haar wavelet transform. Start with an n by n matrix of coefficients 17 whose entries correspond to the numeric value of a color component (say, Red, Green or Blue) of a square screen image of n by n pixels. Divide the original matrix 17 into 2 by 2 blocks of four coefficients, and for each 2×2 block, label the coefficient in the first column, first row "a,"; second column, first row "b"; second row, first column "c"; and second row, second column "d."

Then one step of the Haar wavelet transform creates four n/2 by n/2 matrices. The first is an n/2 by n/2 approximation matrix 8 whose entries equal the "average" of the corresponding 2 by 2 block of four coefficients in the original matrix 17. As is illustrated in FIG. 2, the coefficient entries in the approximation matrix 8 are not necessarily equal to the average of the corresponding four coefficients a, b, c and d (i.e., a'=(a+b+c+d)/4) in the original matrix 17. Instead, here, the "average" is defined as (a+b+c+d)/2.

The second is an n/2 by n/2 horizontal difference matrix 10 whose entries equal b'=(a+b−c−d)/2, where a, b, c and d are, respectively, the corresponding 2×2 block of four coefficients in the original matrix 17. The third is an n/2 by n/2 vertical difference matrix 9 whose entries equal c'=(a−b+c−d)/2, where a, b, c and d are, respectively, the corresponding 2×2 block of four coefficients in the original matrix 17. The fourth is an n/2 by n/2 diagonal difference matrix 11 whose entries equal d'=(a−b−c+d)/2, where a, b, c and d are, respectively, the corresponding 2×2 block of four coefficients in the original matrix 17.

A few notes are worthy of consideration. First, the entries a', b', c', d' are the wavelet coefficients. The approximation matrix 8 is an approximation of the original matrix 17 (using the "average" of each 2×2 group of 4 pixels) and is one fourth the size of the original matrix 17.

Second, each of the 2×2 blocks of four entries in the original matrix 17 has one corresponding entry in each of the four n/2 by n/2 matrices. Accordingly, it can readily be seen from FIG. 2 that each of the 2×2 blocks of four entries in the original matrix 17 can be reconstructed exactly, and the transformation is invertible. Therefore, the original matrix 17 representation of an image can be discarded during processing once the transform is obtained.

Third, the transform can be repeated, each time starting with the last approximation matrix 8 obtained, and then discarding that approximation matrix 8 (which can be reconstructed) once the next wavelet step is obtained. Each step of the transform results in approximation and difference matrices ½ the size of the approximation matrix 8 of the prior step.

Retracing each step to synthesize the original matrix 17 is called the inverse wavelet transform, one step of which is depicted in FIG. 2b.

Finally, it can readily be seen that the approximation matrix 8 at varying levels of the wavelet transform can be used as a representation of the relevant color component of the image at varying levels of resolution.

Conceptually then, the wavelet transform is a series of approximation and difference matrices at various levels (or resolutions). The number of coefficients stored in a wavelet transform is equal to the number of pixels in the original matrix 17 image representation. (However, the number of bits in all the coefficients may differ from the number of bits in the pixels. Applying data compression to coefficients turns out to be generally more effective on coefficients.) If we assume the image is very large, the transform matrices must be further decomposed into blocks when stored on the storage means 3.

Figure 3:
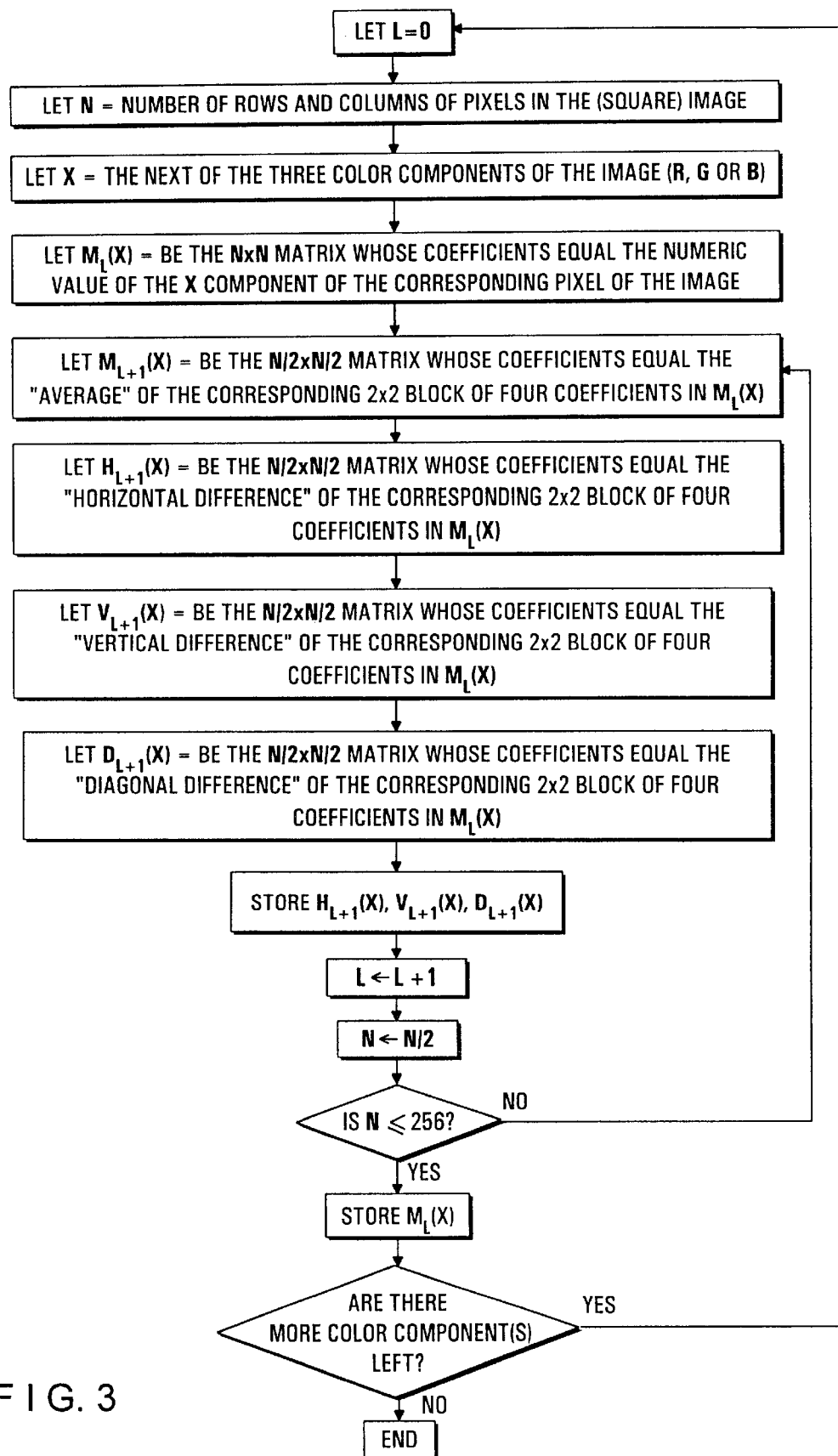
FIG. 3 is a flowchart showing an algorithm the server may execute to perform a Haar wavelet transform in one embodiment of the present invention.

FIG. 3 is a flowchart showing one possible implementation of the wavelet transform element 13 which performs a wavelet transform on each color component of the original image. As can be seen from the flowchart, the transform is halted when the size of the approximation matrix is 256× 256, as this may be considered the lowest useful level of resolution.

Once the wavelet transform element 13 stores a transform of the image(s) in the storage means 3 of the server 1, the server 1 is ready to communicate with client(s) 2.

In typical practice of the invention the client 2 user initiates a session with an image server 1 and indicates an image the user wishes to view via user input means 6. The client 2 initiates a request for the 256 by 256 approximation matrix 8 for each color component of the image and sends the request to the server 1 via network protocol processing element 12. The server 1 receives and processes the request via network protocol processing element 12. The server 1 sends the 256 by 256 approximation matrices 8 for each color component of the image, which the client 2 receives in similar fashion. The processing device 4 of the client 2 stores the matrices in the storage device 3 and causes a display of the 256 by 256 version of the image on the display 5. It should be appreciated that the this low level of resolution requires little data and can be displayed quickly. In a map server application, the 256 by 256, coarse resolution version of the image may be useful in a navigation window of the display 5, as it can provide the user with a position indicator with respect to the overall image.

A more detailed understanding of the operation of the client 2 will become apparent from the discussion of the further, continuous operation of the client 2 below.

Figure 4:
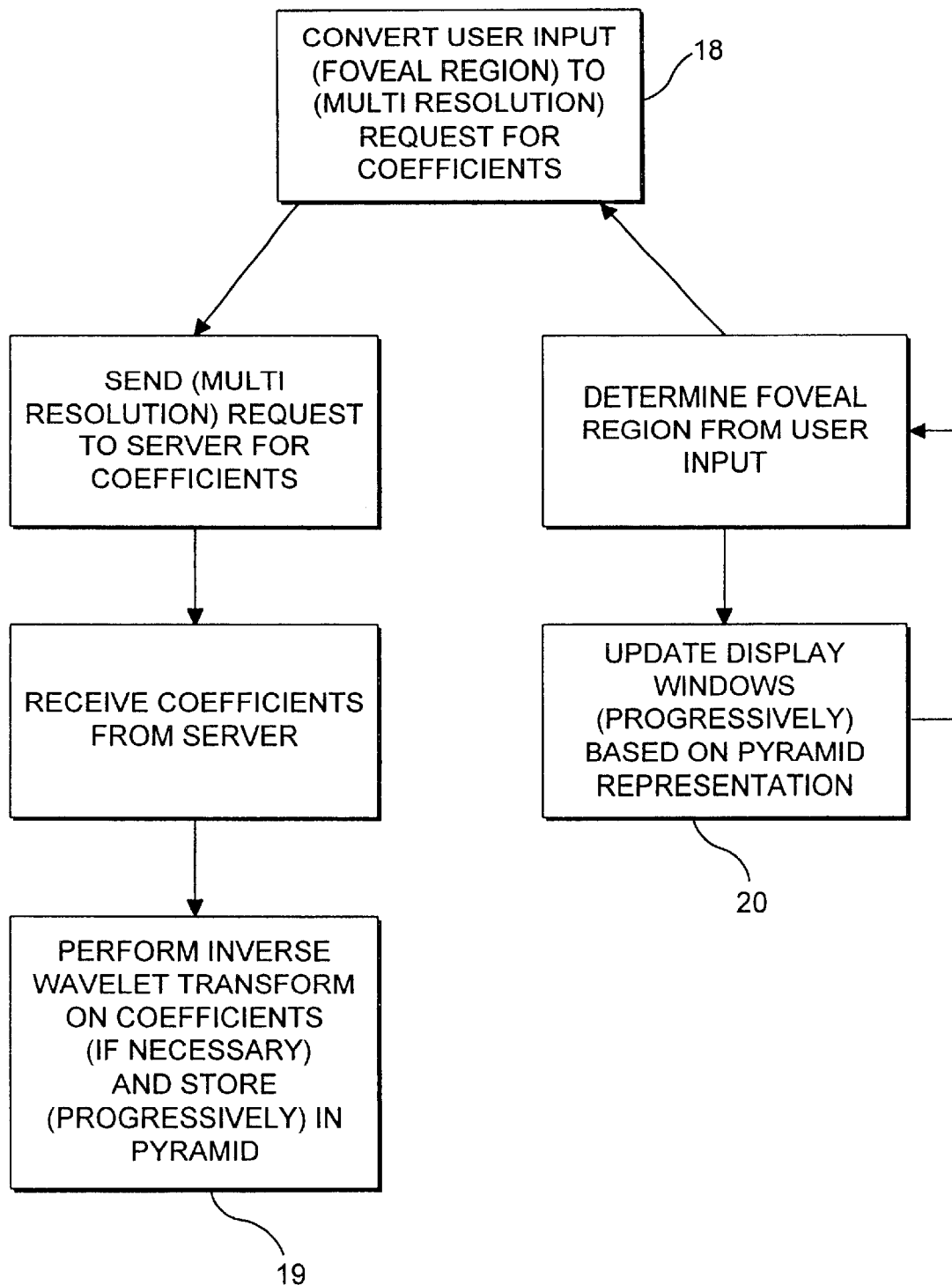
FIG. 4 shows Manager, Display and Network threads, which the client(s) may execute in one embodiment of the present invention.

Continuous operation of the client(s) 2 is depicted in FIG. 4. In the preferred embodiment, the client(s) 2 processing device may be constructed using three "threads," the Manager thread 18, the Network Thread 19 and the Display Thread 20. Thread programming technology is a common feature of modern computers and is supported by a variety of platforms. Briefly, "threads" are processes that may share a common data space. In this way, the processing means can perform more than one task at a time. Thus, once a session is initiated, the Manager Thread 18, Network Thread 19 and Display Thread 20 run simultaneously, independently and continually until the session is terminated. However, while "thread technology" is preferred, it is unnecessary to implement the client(s) 2 of the present invention.

The Display Thread 20 can be based on any modern windowing system running off the processing device 4. One function of the Display Thread 20 is to continuously monitor user input device 6. In the preferred embodiment, the user input device 6 consists of a mouse or an eye-tracking device, though there are other possible implementations. In a typical embodiment, as the user moves the mouse position, the current position of the mouse pointer on the display 5 determines the foveal region. In other words, it is presumed the user gaze point follows the mouse pointer, since it is the user that is directing the mouse pointer. Accordingly, the display thread 20 continuously monitors the position of the mouse pointer.

In one possible implementation, the Display Thread 20 places user input requests (i.e., foveal regions determined from user input device 6) as they are obtained in a request queue. Queue's are data structures with first-in-first-out characteristics that are generally known in the art.

The Manager Thread 18 can be thought of as the brain of the client 2. The Manager Thread 18 converts the user input request in the request queue into requests in the manager request queue, to be processed by the Network Thread 19. The user input conversion mechanism 16 converts the user determined request into a request for coefficients.

Figure 5:
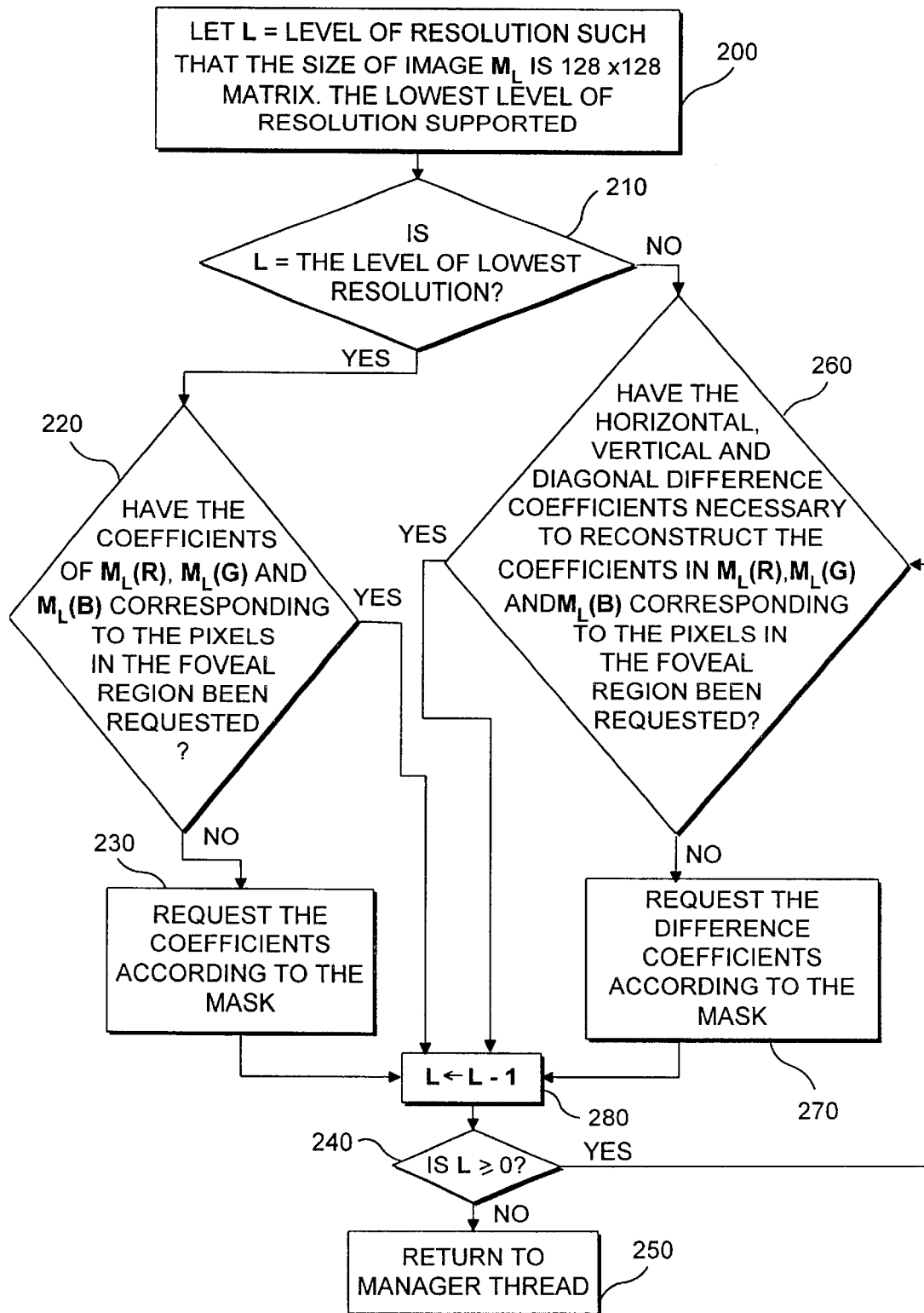
FIG. 5 is a more detailed illustration of a portion of the Manager thread depicted in FIG. 4.

A possible implementation of user input conversion mechanism 16 is depicted in the flow chart in FIG. 5. Essentially, the user input conversion mechanism 16 requests all the coefficient entries corresponding to the foveal region in the horizontal difference 10 matrices, vertical difference 9 matrices, diagonal difference matrices 11 and approximation matrix 8 of the wavelet transform of the image at each level of resolution. (Recall that only the last level approximation matrix 8 needs to be stored by the server 1.) That is, wavelet coefficients are requested such that it is possible to reconstruct the coefficients in the original matrix 17 corresponding to the foveal region.

As the coefficients are included in the request, they are masked out. The use of a mask is commonly understood in the art. The mask is maintained to determine which coefficients have been requested so they are not requested again. Each mask can be represented by an array of linked lists (one linked list for each row of the image at each level of resolution).

As shown in FIG. 5, the input conversion mechanism 16 determines the current level of resolution ("L") of an image ("$M_L$") such that the image $M_L$ is, e.g., 128×128 pixel matrix (for example, the lowest supported resolution), as shown in Step 200. Then, the input conversion mechanism 16 determines if the current level L is the lowest resolution level (Step 210). If so, it is determined if the three color coefficients (i.e., $M_L(R)$, $M_L(G)$, and $M_L(B)$) correspond to the foveal region that has been requested (Step 220). If that is the case, then the input conversion mechanism 16 confirms that the current region L is indeed the lowest resolution region (Step 240), and returns the control to the Manager Thread 18 (Step 250). If, in Step 220, it is determined that the three color coefficients have not been requested, these coefficients are requested using the mask described above, and the process continues to Step 240, and the control is returned to the Manager Thread 18 (Step 250).

If, in Step 210, it is determined that the current level L is not the lowest resolution level, then the input conversion mechanism 16 determines whether the horizontal, vertical and diagonal difference coefficients (which are necessary to reconstruct the three color coefficients) have been requested (Step 260). If so, then the input conversion mechanism 16 skips to Step 280 to decrease the current level L by 1. Otherwise a set of difference coefficients may be requested. This set depends on the mask and the foveal parameters (e.g., a shape of the foveal region, a maximum resolution, a rate of decay of the resolution, etc.). The user may select "formal" values for these foveal parameters, but the Manager Thread 18 may, at this point, select the "effective" values for these parameters to ensure a trade-off between (1) achieving a reasonable response time over the estimated current network bandwidth, and (2) achieving a maximum throughput in the transmission of data. The process then continues to Step 280. Thereafter, the input conversion mechanism 16 determines whether the current level L is greater or equal to zero (Step 240). If that is the case, the process loops back to: step 260. Otherwise, the control is returned to the Manager Thread 18 (Step 250).

The Network Thread 19 includes the network protocol processing element 12. The Network Thread obtains the (next) multi-resolution request for coefficients corresponding to the foveal region from request queue and processes and sends the request to the server 1 via network protocol processing element 12.

Notice that the data requested is "local" because it represents visual information in the neighborhood of the indicated part of the image. The data is incremental because it represents only the additional information necessary to increase the resolution of the local visual information. (Information already available locally is masked out).

The server 1 receives and processes the request via network protocol processing element 12, and sends the coefficients requested. When the coefficients are sent, they are masked out. The mask is maintained to determine which coefficients have been sent and for deciding which blocks of data can be released from main memory. Thus, an identical version of the mask is maintained on both the client 2 side and server 1 side.

The Network Thread 19 of the client 2 receives and processes the coefficients. The Network Thread 19 also includes inverse wavelet transform element 14. The inverse wavelet transform element 14 performs an inverse wavelet transform on the received coefficients and stores the resulting portion of an approximation matrix 8 each time one is obtained (i.e., at each level of resolution) in the storage device 3 of the client 2. The sub-image is stored at each (progressively higher, larger and less course) level of its resolution.

Note that as the client 2 knows nothing about the image until it is gradually filled in as coefficients are requested. Thus, sparse matrices (sparse, dynamic data structures) and associated algorithms can be used to store parts of the image received from the server 1. Sparse matrices are known in the art and behave like normal matrices except that the memory space of the matrix are not allocated all at once. Instead the memory is allocated in blocks of sub-matrices. This is reasonable as the whole image may require a considerable amount of space.

Simultaneously, the Display thread 20 (which can be implemented using any modern operating system or windowing system) updates the display 5 based on the pyramid representation stored in the storage device 3.

Of course, the Display thread 20 continues its monitoring of the user input device 6 and the whole of client 2 processing continues until the session is terminated.

A few points are worthy of mention. Notice that since lower, coarser resolution images will be stored on the client 2 first, they are displayed first Also, the use of foveated images ensures that the incremental data to update the view is small, and the requested data can arrive within the round trip time of a few messages using, for example, the TCP/IP protocol.

Also notice, that a wavelet coefficient at a relatively coarser level of resolution corresponding to the foveal region affects a proportionately larger part of the viewer's screen than a coefficient at a relatively finer level of resolution corresponding to the foveal region (in fact, the resolution on the display 5 exponentially away from the mouse pointer). Also notice the invention takes advantage of progressive transmission, which gives the image perceptual continuity. But unlike the traditional notion of progressive transmission, it is the client 2 user that is determining transmission ordering, which is not pre-computed because the server 1 doesn't know what the client(s) 2 next request will be. Thus, as noted in the objects and advantages section, the "thinwire" model is optimized.

Note that in the event the thread technology is utilized to implement the present invention, semaphores data structures are useful if the threads share the same data structures (e.g., the request queue). Semaphores are well known in the art and ensure that only one simultaneous process (or "thread") can access and modify a shared data structure at one time. Semaphores are supported by modern operating systems.

CONCLUSION

It is apparent that various useful modifications can be made to the above description while remaining within the scope of the invention.

For example, without limitation, the user can be provided with two modes for display: to always fill the pixels to the highest resolution that is currently available locally or to fill them up to some user specified level. The client 2 display 5 may include a re-sizable viewing window with minimal penalty on the realtime performance of the system. This is not true of previous approaches. There also may be an auxiliary navigation window (which can be re-sized but is best kept fairly small because it displays the entire image at a low resolution). The main purpose of such a navigation window would be to let the viewer know the size and position of the viewing window in relation to the whole image.

It is readily seen that further modifications within the scope of the invention provide further advantages to the user. For example, without limitation, the invention may have the following capabilities: continuous realtime panning, continuous realtime zooming, foveating, varying the foveal resolution and modification of the shape and size of the foveal region. A variable resolution feature may also allow the server 1 to dynamically adjust the amount of transmitted data to match the effective bandwidth of the network.

While the above description contains many specificities, these should not be construed as limitations on the scope of the invention, but rather as an exemplification of one preferred embodiment thereof.

Many other variations are possible. Accordingly, the scope of the invention should be determined not by the embodiment(s) illustrated, but by the appended claims and their legal equivalents.

What is claimed is:

1. A server apparatus for providing a realtime visualization of at least one image by at least one client on a network, the server apparatus comprising:
   a processing arrangement which, when executing a computer program, is programmed to:
   receive, from the at least one client, image data which correspond to a selection of an arbitrary set of points to be displayed,
   generate the at least one image based on the image data so as to cause a foveation from the points, and
   update the at least one image by providing incremental spatial-distribution data for the at least one image to form a multifoveated image.

2. The server apparatus according to claim 1, wherein the at least one image is updated using a masking data structure.

3. The server apparatus according to claim 1, wherein the at least one image is updated using a foveation operator based at least one foveation parameter.

4. The server apparatus according to claim 1, wherein the processing arrangement is further capable of updating the at least one image by increasing the resolution of the at least one image utilizing a wavelet-implementation procedure.

5. A method for providing a realtime visualization of at least one image by at least one client on a network, comprising the steps of:
   receiving, from the at least one client, image data which correspond to a selection of an arbitrary set of points to be displayed;
   generating the at least one image based on the image data so as to cause a foveation from the points; and
   updating the at least one image by providing incremental spatial-distribution data for the at least one image to form a multifoveated image.

6. The method according to claim 5, wherein the at least one image is updated using a masking data structure.

7. The method according to claim 5, wherein the at least one image is updated using a foveation operator based at least one foveation parameter.

8. The method according to claim 5, wherein the processing arrangement is further capable of updating the at least one image by increasing the resolution of the at least one image utilizing a wavelet-implementation procedure.

* * * * *

UNITED STATES PATENT AND TRADEMARK OFFICE
CERTIFICATE OF CORRECTION

PATENT NO. : 6,606,655 B1
DATED : August 12, 2003
INVENTOR(S) : Yap et al.

It is certified that error appears in the above-identified patent and that said Letters Patent is hereby corrected as shown below:

<u>Title page,</u>
Item [56], References Cited, OTHER PUBLICATIONS, "R.L. White et al.," reference, "Astonomical" should read -- Astronomical --

<u>Column 1,</u>
Line 35, "(i.e," should read -- (i.e., --

<u>Column 2,</u>
Line 15, "(i.e," should read -- (i.e., --
Line 41, "atempting" should read -- attempting --

<u>Column 3,</u>
Line 23, "visulization" should read -- visualization --
Line 44, "image" should read -- image(s) --
Line 45, "(s)" should be deleted <u>Column 5,</u>
Line 13, "Tape" should read -- tape --
Line 14, "Cartridge" should read -- cartridge --

<u>Column 9,</u>
Line 4, "Queue's" should read -- Queues --

<u>Column 10,</u>
Line 54, "first Also," should read -- first. Also, --

Signed and Sealed this

Third Day of February, 2004

JON W. DUDAS
*Acting Director of the United States Patent and Trademark Office*